3 Sheets—Sheet 1.

S. PARKER & F. G. FORD.
Machine for Winding Yarn.

No. 237,896. Patented Feb. 15, 1881.

WITNESSES
Franck L. Durand
H. Aubrey Toulmin

INVENTOR
Samuel Parker
F. G. Ford
Alexander Mason
ATTORNEYS

3 Sheets—Sheet 2.

S. PARKER & F. G. FORD.
Machine for Winding Yarn.

No. 237,896. Patented Feb. 15, 1881.

WITNESSES
Franck L. Ouraud
H. Aubrey Toulmin

INVENTOR
Samuel Parker
F. G. Ford
Alexander Mason
ATTORNEYS

N. PETERS, PHOTO-LITHOGRAPHER, WASHINGTON, D. C.

3 Sheets—Sheet 3.
S. PARKER & F. G. FORD.
Machine for Winding Yarn.
No. 237,896. Patented Feb. 15, 1881.
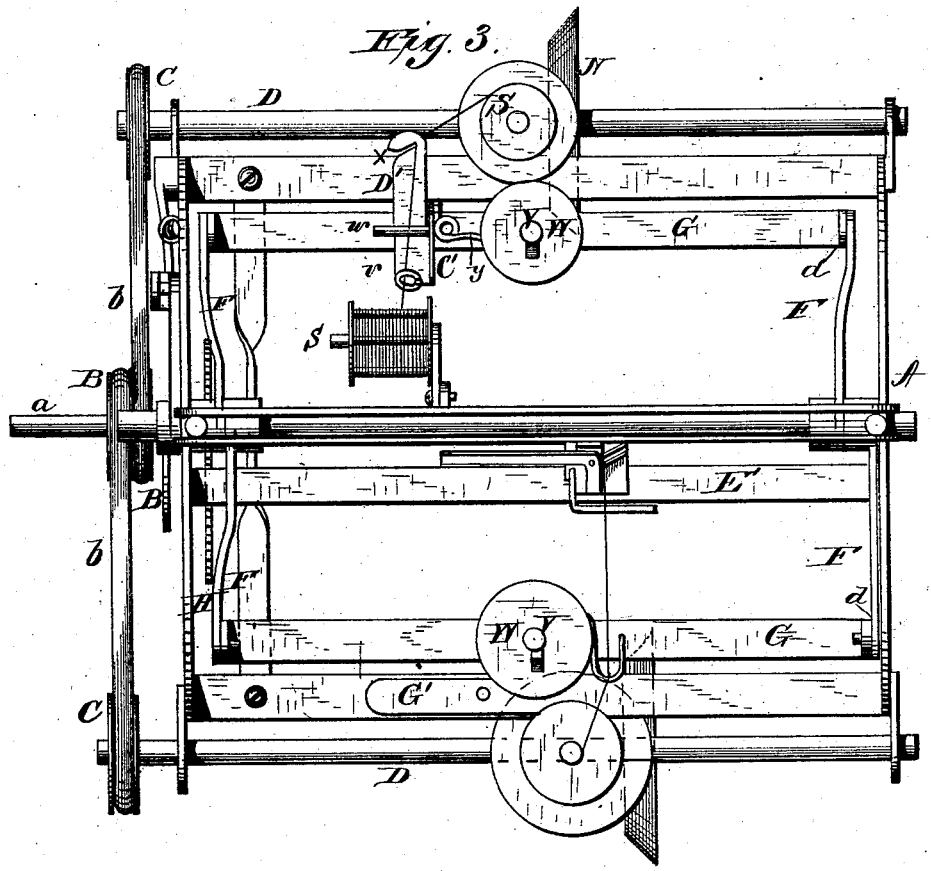
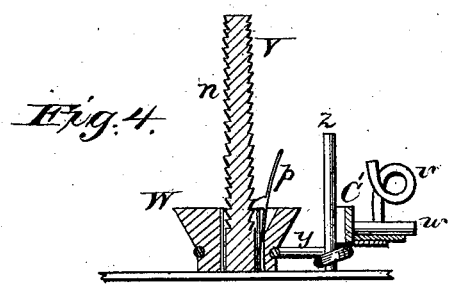
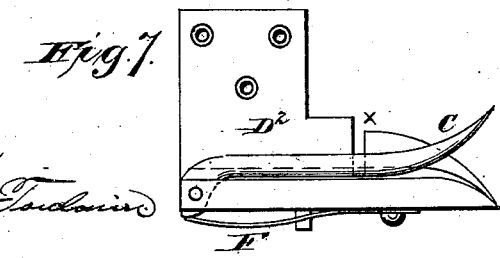
WITNESSES
INVENTOR
Samuel Parker
F. G. Ford
Alexander Mason
ATTORNEYS
N. PETERS, PHOTO-LITHOGRAPHER, WASHINGTON, D. C.

UNITED STATES PATENT OFFICE.

SAMUEL PARKER AND FREDERIC G. FORD, OF PHILADELPHIA, PA.

MACHINE FOR WINDING YARN.

SPECIFICATION forming part of Letters Patent No. 237,896, dated February 15, 1881.

Application filed January 2, 1880.

*To all whom it may concern:*

Be it known that we, SAMUEL PARKER and FREDERIC G. FORD, of Philadelphia, in the county of Philadelphia, and in the State of Pennsylvania, have invented certain new and useful Improvements in Machines for Winding Yarn; and we do hereby declare that the following is a full, clear, and exact description thereof, reference being had to the accompanying drawings, and to the letters of reference marked thereon, making a part of this specification.

The nature of our invention consists in the construction and arrangement of a machine for winding yarn, as will be hereinafter more fully set forth.

Figure 1:
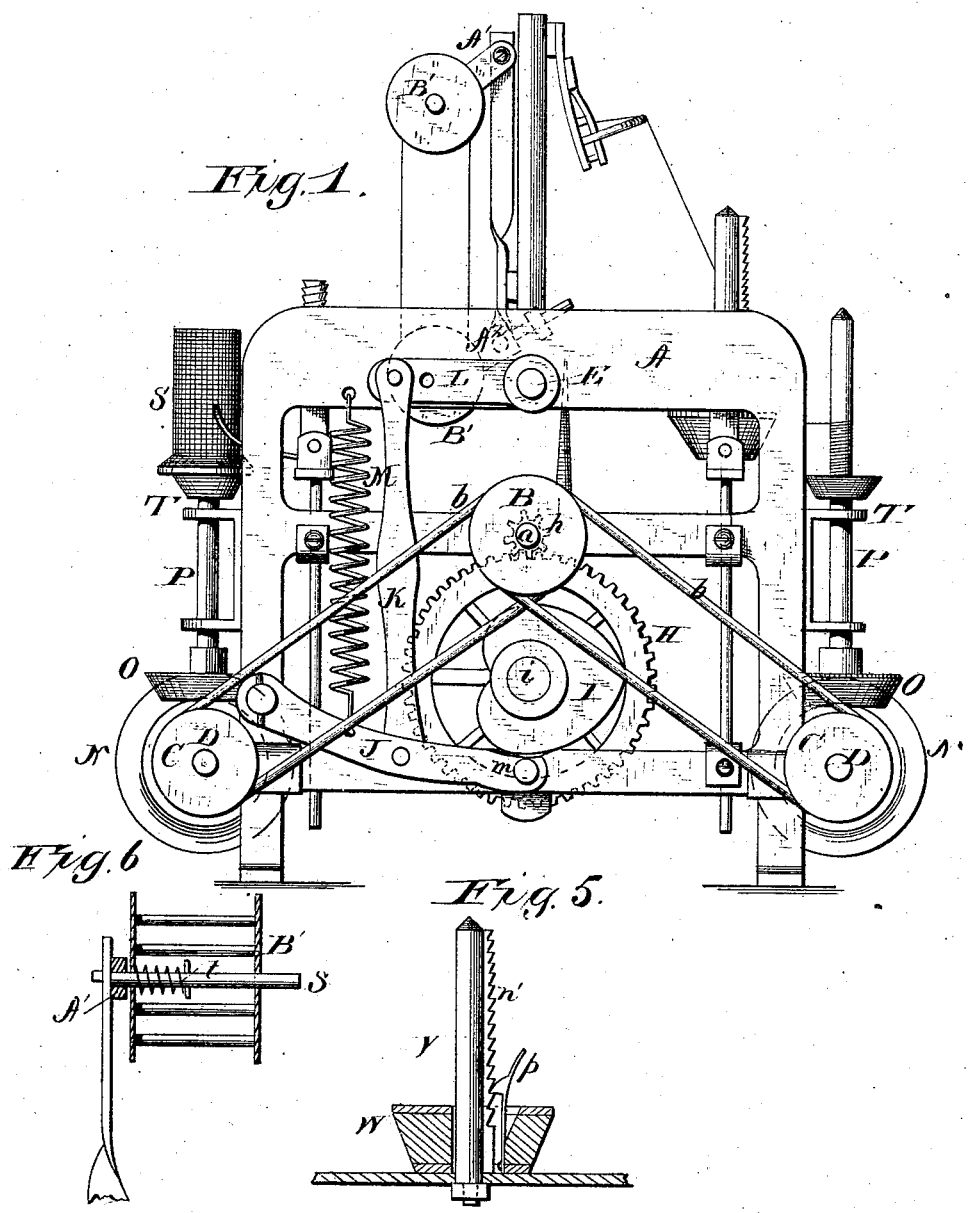
Figure 2:
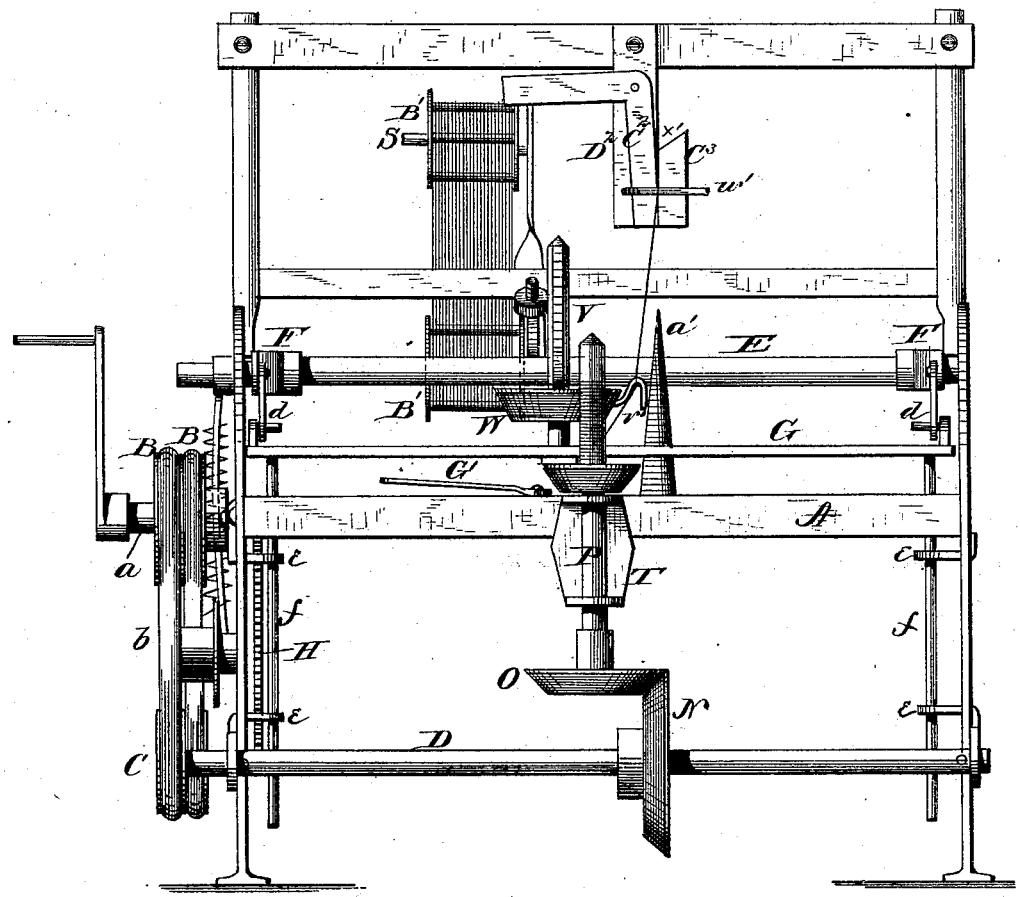

In the annexed drawings, Figure 1 is a side elevation of our machine. Fig. 2 is a front view, and Fig. 3 a plan view, of the same. Figs. 4, 5, 6, and 7 are detail views of parts thereof.

A represents the frame of our machine, constructed in any suitable manner to contain the various working parts.

At one end of the machine is the operating-shaft $a$, upon which are two pulleys, B B, connected, by belts or cords $b\ b$, with pulleys C C on two shafts, D D, located near the bottom, one at each side of the frame.

In the upper part of the frame is a central shaft, E, which rocks in its bearings, and has arms F F near each end projecting in opposite directions. The outer ends of these arms are connected, by links $d\ d$, with a longitudinal bar, G, along each side of the machine, said bar having at each end a vertical guide-rod, $f$, passing through suitable guides $e$.

The shaft E, with devices connected thereto, obtains a rocking motion from a pinion, $h$, on the shaft $a$, which meshes with a cog-wheel, H, on a shaft, $i$. On this shaft is secured a cam, I, which operates against a pin, $m$, on the end of a lever, J, pivoted to the frame. This lever is, by a link, K, connected with an arm, L, attached to the shaft E. A spring, M, holds the lever J up so that its pin $m$ will at all times be in contact with the cam I.

The cog-gearing and pulleys above described are made in such relative proportion that the shafts D will make quite a large number of revolutions while the shaft E rocks or oscillates once, and the spring M, holding up the lever J, causes an even, steady, and uniform motion, without any jars or blows.

In our machine we utilize both sides, one for winding from hanks to bobbins, and the other from cops to bobbins.

Each shaft D is provided with a series of bevel friction-wheels, N, though only one is shown in the drawings, and each friction-wheel N is in contact with a similar wheel, O, upon the lower end of a vertical spindle, P, which is movable up and down in a frame or bearing, T, attached to the main frame. The bobbin S is placed on the upper end of said spindle.

Opposite each spindle P, on the bar G, is a vertical post, V, upon which is placed a slide, W, movable up and down thereon. On one side of the machine the post V is provided with spiral grooves $n$, as shown in Fig. 4, and a spring-dog, $p$, takes into the same for holding the slide in place, while on the other side of the machine the post has a grooved or toothed rib, $n'$, as shown in Fig. 5, into which the spring-dog takes; but it is evident that either of these devices may be used indiscriminately, as the sole object is to hold the slide at any desired height.

For each of the spindles P on one side of the machine are two arms, A' A², provided with projecting pins or spindles $s\ s$, to receive the two reels B' B', over which the hank is placed. The upper arm, A', is rigid, while the lower arm, A², is pivoted, so that the weight of this arm and the lower reel will keep the hank extended. The upper spindle, $s$, has a spiral spring, $t$, around it, which holds the upper reel against the arm A', so as to create a tension to prevent the yarn from unwinding too fast. The yarn passes from the hank through a guide-wire, $v$, under a pin, $w$, projecting from a bar, C', and thence through a slot, $x$, in the end of a plate, D', to the bobbin. The guide-wire $v$ is made fast and the bar C' pivoted to the plate D', and said plate is held by a wire or arm, $y$, projecting from the slide W. The wire or arm $y$ passes over a pin, $z$, on the bar G to keep it in position. The bar C' and its pin $w$ straighten the yarn, while the slot $x$ takes out all the lumps. On the other side of the center of the machine is a movable bar, E', which carries a series of spindles, $a'$, to receive the cops. From the cop the yarn passes upward through a slot, $x'$, in a plate, $D^2$, thence between a pivoted L-shaped lever, $C^2$, and a stationary piece, $C^3$, and over a wire, $w'$, to the guide carried by the slide W.

In Fig. 7 we have shown a modification, in which an adjustable spring, $F'$, is made use of to regulate the tension of the lever.

The rocking shaft E, with the bars G, carrying the guide-wires, as described, causes the yarn to be moved slowly up and down, so as to wind properly on the bobbins. As the yarn is wound upon the bobbin in the operation of the machine, the diameter of the bobbin at its lower end is gradually increased, and in the downward movement of the bar G the slide W is raised on the post V by the yarn, and held in its raised position by the spring-dog $p$ engaging with the spiral groove $n$ in the post, a similar operation occuring in the opposite side of the machine, whereby the guide is raised automatically to its proper position for winding the yarn on the bobbin.

Any one of the spindles P can instantly be thrown out of gear without stopping the machine by means of a lever or button, $G'$, pivoted on the frame, which may be thrown under the flange $b'$ on the spindle that supports the bobbin, thereby raising said spindle so as to move the friction-wheel O from contact with the wheel N.

Having thus fully described our invention, what we claim as new, and desire to secure by Letters Patent, is—

The combination of the bar G, means, substantially as set forth, for vertically reciprocating the same, toothed post V, post $z$, slide W, having spring-catch $p$, arm $y$, passing around the slide W, slotted plate D, guide-wire $v$, pivoted bar C, and pin $w$, the tension device and slide being both connected with the reciprocating bar, substantially as described.

In testimony that we claim the foregoing we have hereunto set our hands this 1st day of December, 1879.

SAML. PARKER.
FREDERIC G. FORD.

Witnesses:
CHARLES H. WEISS,
WM. H. EMHARDT.